United States Patent [19]

Morrow, Jr. et al.

[11] 4,281,404
[45] Jul. 28, 1981

[54] DEPTH FINDING APPARATUS

[75] Inventors: Ray E. Morrow, Jr.; Richard W. Woodson, both of Salem, Oreg.

[73] Assignee: Morrow Electronics, Inc., Salem, Oreg.

[21] Appl. No.: 69,858

[22] Filed: Aug. 27, 1979

[51] Int. Cl.³ ............................................. G01S 15/14
[52] U.S. Cl. .................................. 367/108; 367/910
[58] Field of Search ............................. 367/108, 910

[56] References Cited
U.S. PATENT DOCUMENTS

| 2,935,728 | 5/1960 | Morgan | 367/101 |
| 3,079,583 | 2/1963 | Beitscher et al. | 367/910 X |
| 3,267,414 | 8/1966 | Kritz | 367/910 X |
| 3,588,795 | 6/1971 | Linardos et al. | 367/108 |
| 3,948,086 | 4/1976 | Kitada | 367/108 |

FOREIGN PATENT DOCUMENTS

| 2389142 | 11/1978 | France | 367/108 |
| 1432774 | 4/1976 | United Kingdom | 367/910 X |

Primary Examiner—Richard A. Farley
Attorney, Agent, or Firm—Klarquist, Sparkman, Campbell, Leigh, Whinston & Dellett

[57] ABSTRACT

A hand held, self-contained depth finding device is immersible into water for transmitting and receiving sonic impulses in the direction the device is aimed. The device includes a hand grip carrying a battery cartridge and an external trigger for operating a power switch within the waterproof interior. A liquid crystal display registers the measured depth in feet.

12 Claims, 8 Drawing Figures

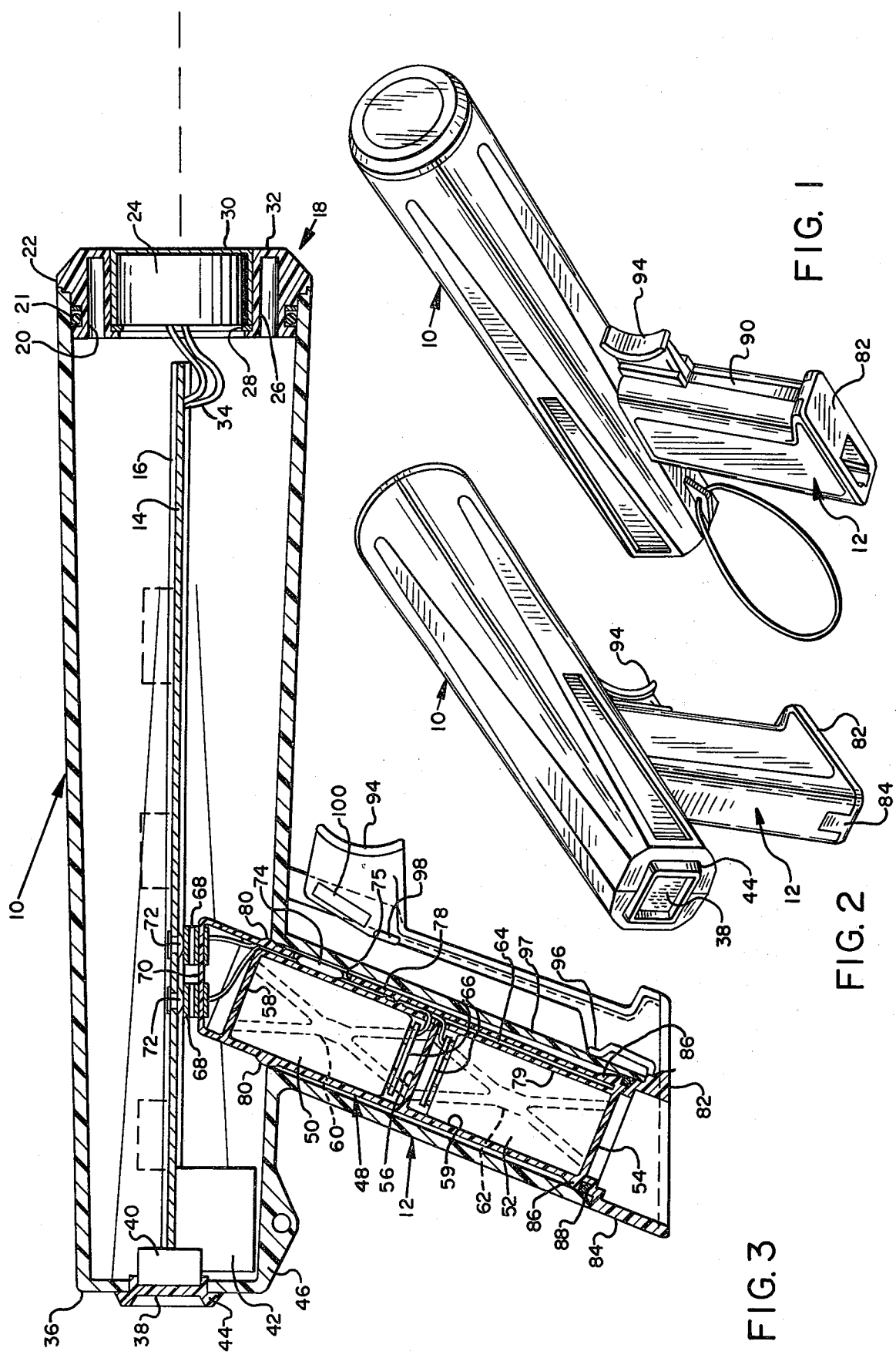

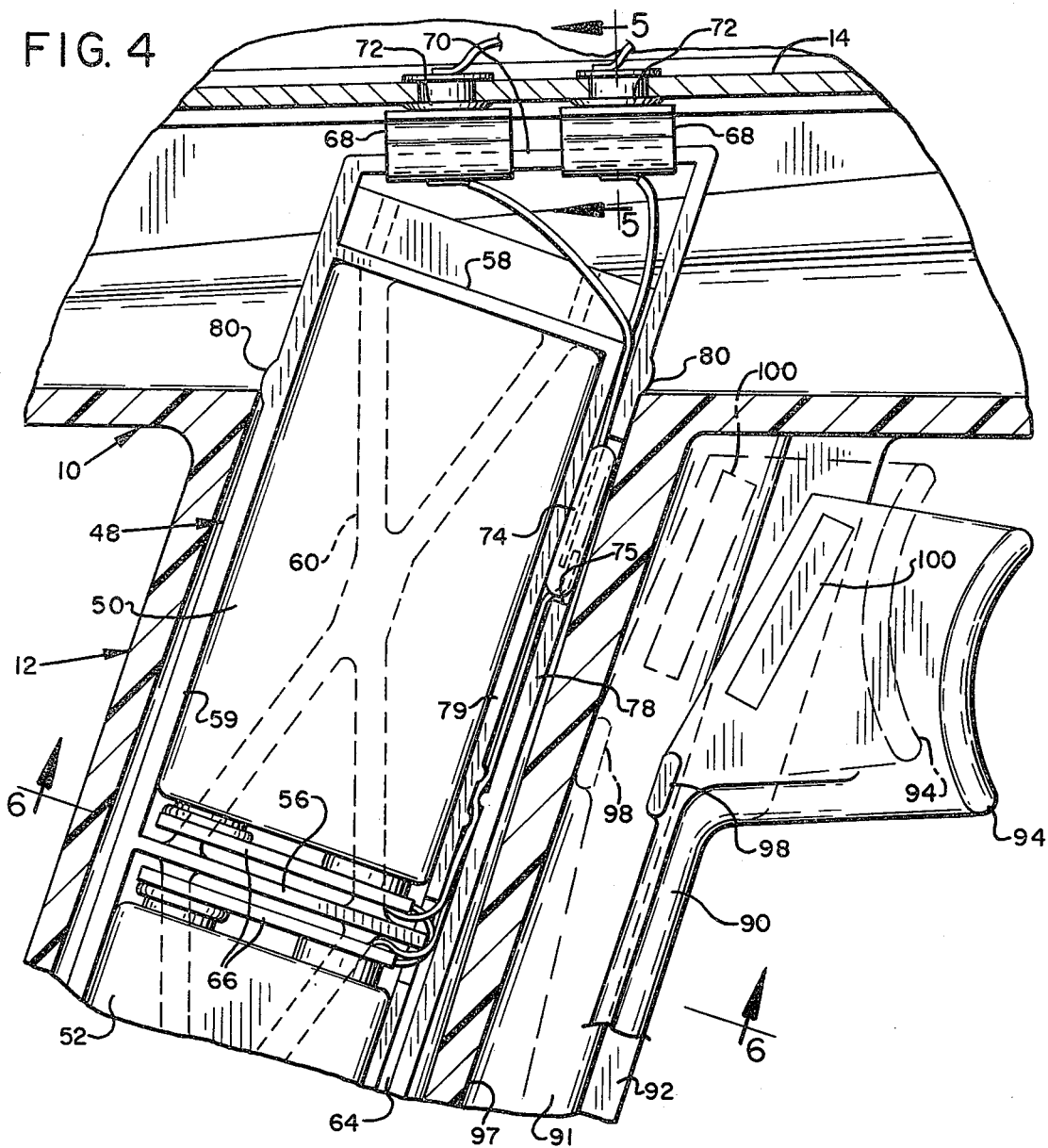
FIG. 4
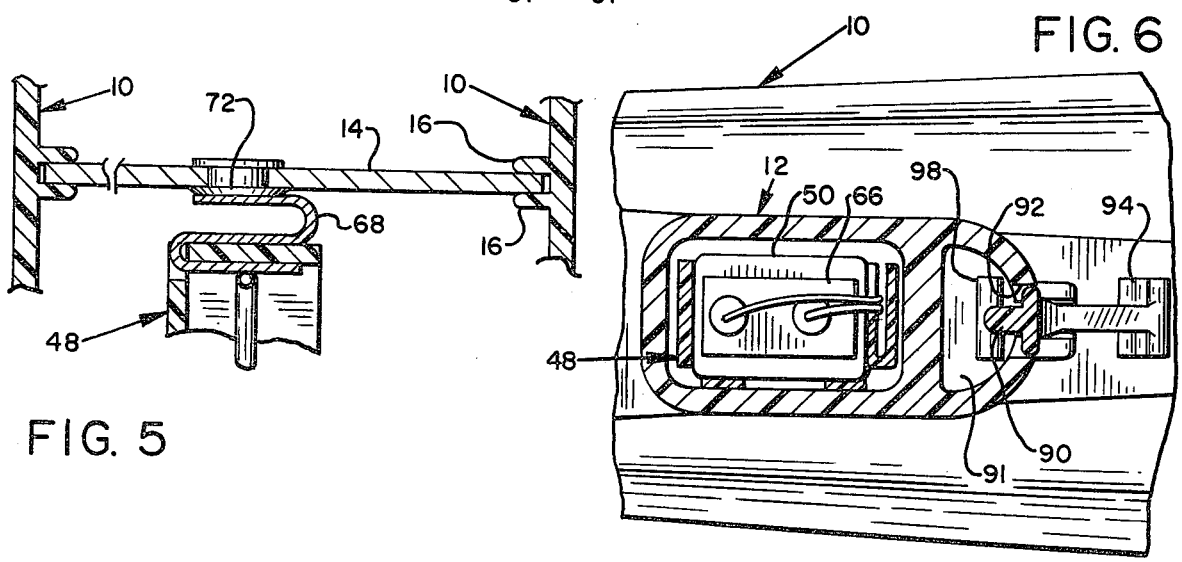
FIG. 5
FIG. 6

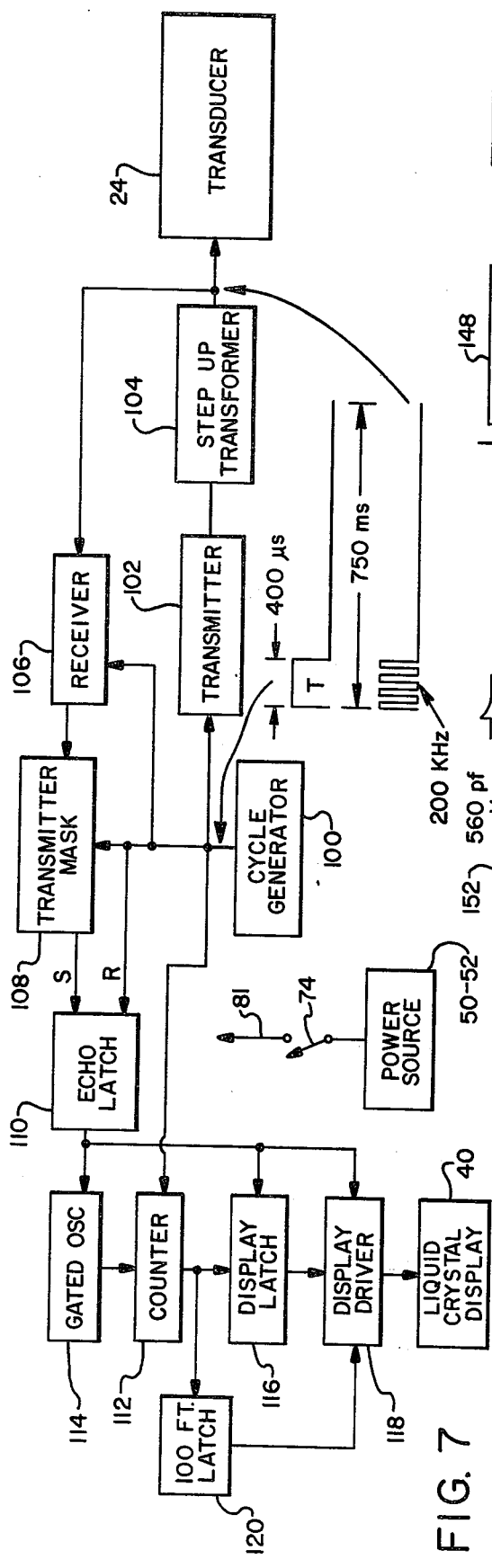
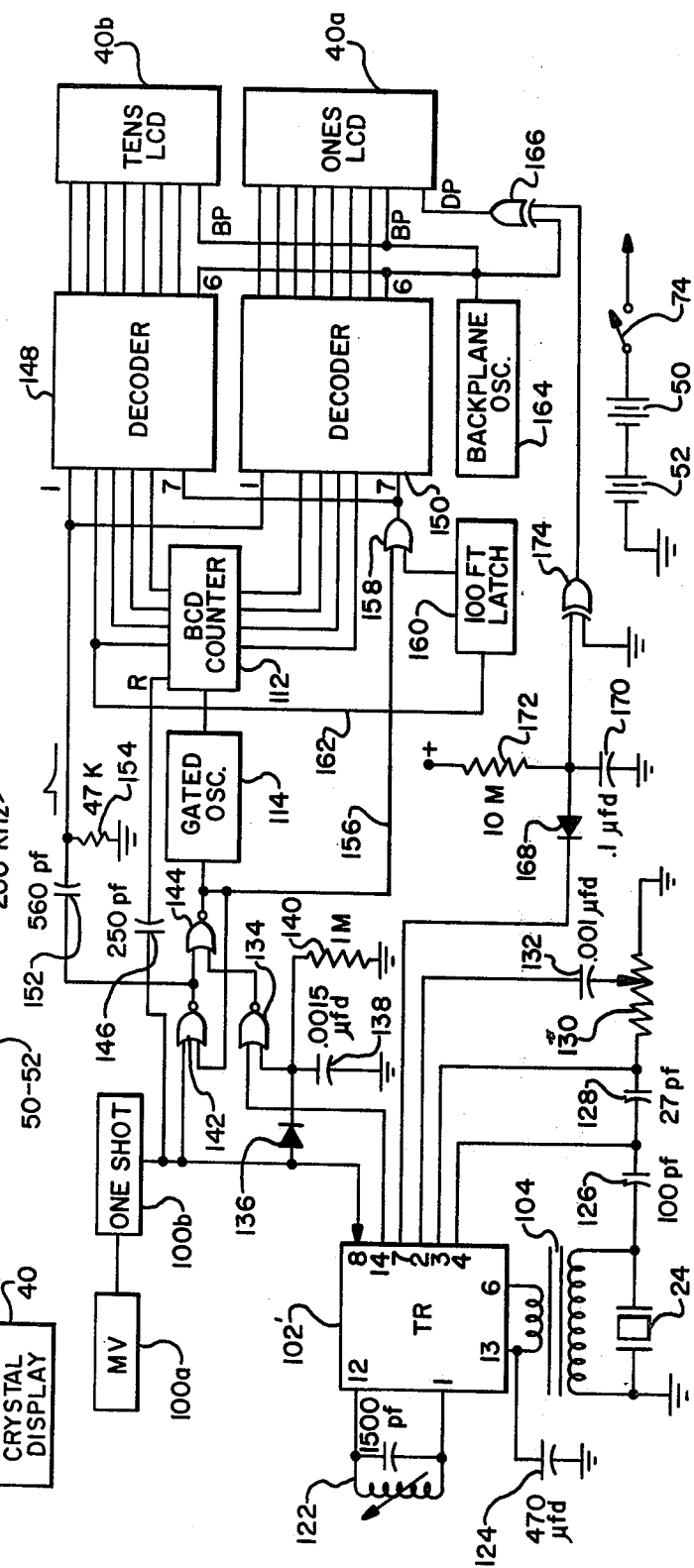
FIG. 7
FIG. 8

DEPTH FINDING APPARATUS

BACKGROUND OF THE INVENTION

The present invention relates to depth finding apparatus and particularly to depth finding apparatus conveniently usable in almost any boat or vessel.

Most depth sounding devices comprise fairly cumbersome apparatus permanently mounted in a vessel, for example including a transducer mounted on the hull of the vessel below the waterline for transmitting sonic pulses under water and receiving echoes therefrom. Echo indicating means are positioned remotely from the transducer at a convenient location for viewing, and the apparatus may be empowered by the power source in the vessel. Although some smaller depth sounding devices are available, they also tend to be multi-unit devices employing moving parts, for example rotatable scanners, and are somewhat unreliable in their operation.

The depth measuring direction for most depth finders is downward, i.e. toward the bottom of the body of water, whereby the device is employed almost entirely to detect the depth of water underneath the vessel. While floating objects or fish may be incidentally detected, there is generally no flexibility or control in the direction of the sonic beam emitted from the usual depth finding device so as to facilitate exploration of a particular underwater area.

Furthermore, prior depth finding devices of the digital output variety have been characterized by a continuously changing and largely erroneous numerical output. The proper output value must be viewed amid false information and is picked out because of the repetition of its presentation, or because of the logical magnitude represented thereby.

SUMMARY OF THE INVENTION

According to the present invention, in a preferred embodiment thereof, a depth finding apparatus comprises a hand held, self-contained housing having a water immersible nose carrying a sonic transducer adapted to transmit and receive sonic impulses in a direction substantially forward thereof. The said housing includes transmitting and receiving circuitry having electrical connection with the transducer and located within a watertight interior. Trigger or switch means operate a self-contained source of power for energizing the transmitting and receiving circuitry, while a liquid crystal display means is located toward the rear of the housing above the water surface and is connected to the receiving circuitry for registering the measured depth. The apparatus is conveniently aimable in any direction for exploring underwater surfaces and locating of fish and other submerged objects, as well as detection of the depth or the bottom of the body of water. The complete apparatus is self-contained and easily employed by an individual in any vessel, no matter how small, or is even usable without a vessel.

According to another feature of the invention, the numerical output provided by the liquid crystal display is restricted to valid echo indications. That is, rather than continuously displaying erroneous count information as frequently is the case with digital output depth finders, the depth indication is latched and displayed only when an echo is valid.

It is therefore an object of the present invention to provide an improved portable depth finder apparatus.

It is another object of the present invention to provide an improved depth finder apparatus which is aimable in any direction.

It is another object of the present invention to provide an improved depth finder apparatus which is self-contained and usable on substantially any boat or vessel regardless of size thereof.

It is another object of the present invention to provide an improved depth finder apparatus which is hand submersible in water It is another object of the present invention to provide an improved depth finder apparatus which is conveniently hand held in a body of water and provides a numerical output at the rearward end thereof for convenient reading by the operator.

It is another object of the present invention to provide an improved depth finder apparatus which supplies an output indication only upon detection of a valid echo return.

The subject matter which we regard as our invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a forward perspective view of a depth finder apparatus according to the present invention;

FIG. 2 is a rearward perspective view of the same depth finder apparatus;

FIG. 3 is a vertical cross section of the depth finder apparatus according to the present invention;

FIG. 4 is a partially broken away and enlarged portion of the FIG. 3 cross section particularly illustrative of trigger operation;

FIG. 5 is a partially broken away cross section taken at 5—5 in FIG. 4;

FIG. 6 is a partially broken away cross section taken at 6—6 in FIG. 4;

FIG. 7 is a block diagram of circuitry employed in the depth finder apparatus according to the present invention; and FIG. 8 is a schematic diagram of the circuitry employed in the depth finder apparatus according to the present invention.

DETAILED DESCRIPTION

Referring to the drawings and particularly to FIGS. 1, 2 and 3, the case or housing of a depth sounding apparatus according to the present invention includes a hollow, tapered barrel-shaped portion 10 and a hand grip portion 12 unitary with the barrel portion and extending downwardly and rearwardly therefrom. The barrel portion and hand grip portion are formed of a plastic material, suitably ultraviolet stabilized Noryl, and, together with other components hereinafter more fully described, provide a substantially watertight enclosure for receiving an electronic circuit board 14 positioned in a groove formed between ridges 16. The barrel portion is tapered to a larger diameter at its forward end for receiving annular shaped nose piece 18 also formed of plastic. Rearwardly extending axial flange 20 of the nose piece fits inside the barrel portion, and outer rim 22 matingly engages the forward end of the barrel portion. A circumferential groove in flange 20 suitably receives a seal and retainer assembly 21, or alternatively the nose piece can be welded or secured by adhesive to the barrel portion, whereby in any case to form a watertight seal. The nose piece 18 has a rearwardly extending cylindrical hub 26 for centrally receiving a sonic transducer 24. This transducer is spaced from the apertured rear wall of the hub by a cork washer 28, and is otherwise sealingly secured to the cylindrical inner wall of the hub with an epoxy material 30 which also extends over the front of the transducer in flush relation to the front 32 of the nose piece. Electrical conductors 34 extend through the apertured rear wall of the hub 26 for connecting the transducer to appropriate circuitry on circuit board 14 as hereinafter more fully described. The transducer 24 is a barium titanate device manufactured by Radar Sonics of Orange, Calif., and provides a beam width of about nine degrees in water, into which the same is submerged as by locating the front end of the barrel portion and nose piece beneath the surface of a body of water.

The rear wall 36 of barrel portion 10 is provided with an aperture receiving a clear acrylic window 38 which is welded ultrasonically to the edge of the aperature. A liquid crystal display device 40 is positioned in mating relation to the window just interior to the barrel portion 10 and is supported in position by the rearward end of circuit board 14 and a downward extension 42 thereof. The exterior of window 38 includes a thickened flange 44 covering the edge of the aperture, and an inwardly extending cylindrical portion that receives the liquid crystal display device in such fashion that the numerals displayed are clearly viewable through the thinner central part of the acrylic window. The barrel portion 10 suitably includes an apertured line engaging tab 46 at the lower rear end by means of which the apparatus may be secured against loss by dropping in the water.

The hand grip portion 12 is also hollow, communicating with the barrel portion, and is designed not only for convenient carrying and aiming of the device, but also for housing the source of power and an operating trigger. Hand grip portion 12 matingly receives a battery cartridge 48 which slides upwardly into the hand grip portion from below, and suitably carries a pair of nine volt, alkaline batteries 50 and 52 disposed in adjacent compartments with their terminal connections facing one another. The battery compartments are formed by a first lower end wall 54 and intermediate transverse walls 56 and 58 extending across the cartridge between cartridge rear wall 59 and inner wall 79. The back sides of the compartments are completed by cross-shaped back braces 60 and 62.

A wiring channel 64 is located on the forward side of the battery cartridge between forward wall 78 and inner wall 79 and receives wires extending from battery connection clips 66 and leading to spring connectors 68 located on upper wall 70 of the battery cartridge. The upper cartridge wall 70 is disposed in parallel relation to circuit board 14 with the cartridge in position, and the battery cartridge is of suitable length such that spring connectors 68 close a circuit with contacts 72 on the circuit board for empowering the apparatus.

Along channel 64 in the wiring between the battery connection clips and the spring connectors, a glass encapsulated reed switch 74 is located which extends through an aperature 75 in forward wall 78 of the battery cartridge, and when this reed switch is closed as hereinafter more fully described, a series circuit is established via the reed switch between the batteries and contacts 72.

At the upper end of the battery cartridge, the same is provided detent protrusions 80 for engaging the inside of the lower wall of barrel portion 10, thereby tending to hold the battery cartridge in position. The battery cartridge includes a lower outwardly extending flange 82 and a heel tab 84 by means of which the battery cartridge may be grasped for insertion and removal with respect to the hand grip portion. Triangular guides 86 forming part of the cartridge position the lower end of the cartridge within the hand grip portion, and an O-ring seal 88 immediately below the triangular guides seals the battery cartridge when it is inserted so as to render the enclosure thereabove watertight. It will be seen the entire interior of the housing is sealed, with the battery cartridge in place, by means of the seal 88, the nose piece 18, and the rear window 38.

The battery cartridge, suitably formed of an acetyl copolymer, ultraviolet stabilized and self-lubricating, such as Celcon M90-08 manufactured by the Celanese Corporation of Summit, N.J., is tough and flexible and includes a trigger arm 90 unitary with and extending upwardly from lower flange 82. The trigger arm 90, which is T-shaped in cross-section and tapers to a smaller width near the top thereof, is slidably received within a forward slot 92 in the grip portion (see FIGS. 4 and 6), and carries a trigger handle 94 at its upper end. The trigger arm includes a lower abutment 96 which bears against the front wall 97 of the hand grip portion so that flexure of the trigger arm will take place mainly above such abutment. The trigger arm also carries an upper abutment 98 which locates the trigger arm in actuated and non-actuated positions. The trigger moves into a non-waterproof chamber 91 located on the forward side of the hand grip portion.

The trigger arm houses a magnet 100 which is slidably received therewithin immediately to the rear of the trigger handle 94. In the relaxed position of the trigger, for example as illustrated in FIG. 3 and in full line in FIG. 4, the magnetic field of the magnet is of insufficient strength at the location of reed switch 74 to cause closure of the contacts of the reed switch. However, when the trigger is depressed to the dashed line position illustrated in FIG. 4, the magnet is in close enough proximity to the reed switch to close the contacts thereof, the contacts thereby completing a circuit between the batteries and contacts 72 whereby to energize the apparatus. The circuit is completed entirely interior of the water tight housing, while movement of the trigger is exterior to the housing.

Circuit board 14 supports components in general comprising transmitting and receiving circuitry having electrical connection with the sonic transducer as well as with the power supply and the liquid crystal display means. Referring to FIG. 7, this circuitry is illustrated in block diagram form. A cycle generator 100, according to the illustrated embodiment, produces a transmit pulse having a duration of 400 microseconds and a cycle time of about 750 milliseconds. The 400 microsecond transmit pulse or T pulse triggers transmitter 102 to energize transducer 24 at a resonant frequency of 200 kilohertz via step up transformer 104. Transducer 24 emits sonic shock waves at this frequency into a body of water in which it is submerged, for the duration of the 400 microsecond transmit pulse from the cycle generator 100. The receiver 106 is disabled at this time. Furthermore, cycle generator 100 operates transmitter mask 108 which receives the output of receiver 106 for insuring that any receiver output during the transmitting operation will be inhibited from reaching echo latch 110.

The cycle generator T pulse also resets echo latch 110 to a predetermined first state and "zeros" counter 112. Counter 112 is employed to count the output of gated oscillator 114. In its first state, echo latch gates the oscillator 114 to provide an output at a frequency of 2.4 kilohertz, or one full cycle for every two feet of sound propagation in water. Thus, after the counter 112 is "zeroed" by the cycle generator 100, it immediately starts counting cycles of output produced by gated oscillator 114.

At a short time after the end of the 400 microsecond T pulse, as determined by transmitter mask 108, receiver 106 can supply an output to echo latch 110 via the transmitter mask for setting the echo latch and concluding the output of the gated oscillator 114 whereby counter 112 will register a fixed value. Receiver 106 sets echo latch 110 upon the reception of an echo representing the bottom of a body of water, or a submerged object such as a fish. In addition to stopping the gated oscillator, the set echo latch enables display latch 116 so the latter latches or holds the count of counter 112, representing the time of the echo after the transmit pulse. At such time, echo latch 110 also enables display driver 118 so that, in accordance with one embodiment of the present invention, a display output is provided only for valid echoes while being blanked the remainder of the time. As display driver 118 is enabled, a digital output is provided by liquid crystal display 40, indicating, in feet, the distance to the submerged article or other underwater surface that produced the echo. In the instance of another embodiment, the display driver 118 continuously couples the output of the display latch 116 to liquid crystal display 40. Since the display latch only becomes latched in the case of a valid echo, it will hold the same between echoes.

According to a further embodiment, a "100 FT." latch 120 is triggered when counter 112 reaches a predetermined count value. The output of "100 FT." latch 120 is coupled to display driver 118 for disabling the same should the counter attain such predetermined value. The reason for this latch 120 is to prevent "wrap around" or the display of a numerical output value when the representative count differs therefrom by a value of 100. In accordance with an illustrated embodiment, the liquid crystal display 40 displays two decimal digits, i.e. the units digit and the tens digit. Since the hundreds digit is not given, it will be appreciated some ambiguity can exist between say an indication for ten feet and an indication for one hundred ten feet. The "100 FT." latch in such case is designed to disable the display entirely for counts of over one hundred feet.

The power source for the circuitry comprises batteries 50 and 52 connected in series with trigger operated reed switch 74. It is understood arrow 81 indicates power connection to each part of the circuitry.

Turning now to FIG. 8, circuitry of apparatus according to the present invention is illustrated in greater detail. Cycle generator 100 suitably comprises a multivibrator 100a having a cycle time of 750 milliseconds and providing an output for triggering one shot multivibrator 100b adapted to provide an output "T" pulse of 400 microseconds duration. The multivibrators 100a and 100b suitably each comprise a type 7555 integrated circuit device. The output of one shot multivibrator 100b is applied to pin 8 of transmitter receiver 102', suitably comprising a type LM1812 National Semiconductor integrated circuit device provided with a tuned circuit 122 tuned to 200 kilohertz. Pins 13 and 6 of the transmitter receiver are connected to the primary winding of step up transformer 104, the secondary of which is connected across transducer 24. One terminal of the secondary winding is grounded, while pin 13 at the primary is coupled to a terminal of a capacitor 124 employed to store charge for operating the transducer via the step up transformer. The remaining terminal of capacitor 124 is grounded. The ungrounded terminal of the secondary winding of step up transformer 104 is connected in series with capacitors 126 and 128 and potentiometer 130, the latter being returned to ground. The tap between capacitors 126 and 128 is connected to the RF input of the receiver portion of device 102' at pin 4, and the tap between capacitor 128 and potentiometer 130 is connected to the first RF output of the receiver at pin 3. The second stage RF input of the receiver at pin 2 is coupled by way of capacitor 132 to the movable arm of the potentiometer 130 and the latter is used for adjusting receiver gain. The negative-going receiver output at terminal 14 is connected as one input of NOR gate 134, the latter forming part of the transmitter mask 108 (in FIG. 7). It will be observed the output of one shot multivibrator 100b is coupled to the remaining NOR gate input by way of diode 136, also having its output or cathode connected to the parallel combination of capacitor 138 and resistor 140 returned to ground and operating as an integrating circuit. As long as the transmit pulse is produced by one shot multivibrator 100b, and for a short time thereafter as determined by the integrating circuit, the lower input of NOR gate 134 is held up thereby masking the output of the receiver at pin 14 of transmitter receiver 102'. The output of NOR gate 134 will remain low for slightly beyond the duration of the transmit pulse.

NOR gates 142 and 144 are connected to form echo latch 110 (in FIG. 7). The T pulse output from one shot multivibrator 100b raises the first input of NOR gate 142, causing the output of the NOR gate to drop, and the output of NOR gate 144 to rise, said output being connected back to an input of NOR gate 142 for holding the latch in a reset condition. As long as the transmit pulse continues, the output of gate 134 will remain low as hereinbefore mentioned, whereby the condition of the echo latch will not be altered. However, subsequent to the conclusion of the transmit pulse, a negative going pulse at the pin 14 of transmit receive circuit 102', indicative of a received echo, will, when applied to NOR gate 134, cause its output to rise, thereby "setting" the echo latch.

As long as the echo latch remains in the reset condition, gated oscillator 114 is enabled from the output of NOR gate 144 and produces a 2.4 kilohertz output signal counted by binary-coded-decimal counter 112. Gated oscillator 114 is suitably a type 4047 integrated circuit device, and counter 112 is a type 4518 integrated circuit device and is employed as a dual or two-stage binary-coded-decimal counter producing a "ones" output on the lower leads and a "tens" output on the upper leads. It is noted binary-coded-decimal counter 112 is reset or "zeroed" via capacitor 146 upon each occurrence of the T pulse.

The binary-coded-decimal counter 112 drives a pair of decoder circuits, i.e. a ones decoder circuit 150 and a tens decoder circuit 148 which perform the functions of display latch 116 and display driver 118 in FIG. 7. Each of the decoders comprises a type 4543 integrated circuit device and each respectively receives the binary coded version of one of the decimal digits employed for the depth indication. The decoders latch the information provided on the respective input leads from counter 112 when they receive an input at pin 1 from the echo latch by way of the differentiating circuit comprising serially coupled capacitor 152 and resistor 154 returned to ground. Thus, when a received echo is indicated and the echo latch comprising gates 142 and 144 goes to the set condition, the output of gate 142 rises providing the pulse input to the decoders 148 and 150 for thereupon latching in decoders 148 and 150 the current count of binary-coded-decimal counter 112. It will be noted this count is static at such time inasmuch as oscillator 114 is no longer gated when the echo latch assumes the set state. Each of the decoders includes conventional decoding circuitry for transforming the binary-coded-decimal information to seven-segment information appropriate for the liquid crystal display devices 40a or 40b.

The actual output to the display devices 40a and 40b is enabled at pin 7 of each of the decoders, i.e. the output will be blank unless pin 7 is down. According to one embodiment, then, the output of NOR gate 144 is provided on lead 156 to OR gate 158, the output of which is connected to pin 7 of each of the decoders 148 and 150. The low-going output of NOR gate 144 when the echo latch becomes set by a received echo then enables pin 7 of each of the decoders. According to an alternative embodiment, this lead is omitted or selectably switched off (grounded) whereby the decoders hold and cause the display devices to display a given valid echo response until the next valid echo response occurs. The latter mode of operation can be useful in detecting the bottom surface of a body of water. The decoders latch information only in response to a valid echo notification on each pin 1, and hold such indication for constant display until the next valid echo response is received for correcting the display as a change in depth occurs. Such arrangement avoids a large number of erroneous indications produced by a conventional depth finding apparatus, and holds a constant, easily viewable numerical output that can be read with ease. However, incorporation of lead 156 and associated components insures the presentation of an output display only when the valid echo is received in the same operating cycle, and the display is blank the remainder of the time. This system avoids any confusion between missed echoes on the one hand, and a constant depth echo on the other and is therefore the preferred embodiment. Again, only valid echo distances will be displayed, omitting invalid count information from the counter, and furthermore the valid information is displayed only so long as the valid echo continues to be received.

The 100 FT. latch 160 comprising a type 4013 integrated circuit device receives an output from the binary digit eight pin on the tens side of the binary-coded-decimal counter 112, and becomes latched when the output from pin eight drops. Consequently, the 100 FT. latch 160 will become latched when the depth indication reaches one hundred feet since the binary-coded-decimal code will drop the binary eight in the tens digit position at such time. Only the negative going transition triggers 100 FT. latch 160. When latched, the output of latch 160 goes high and blanks decoders 148 and 150. As hereinbefore described, blanking the display, containing two decimal digits, for echoes farther than one hundred feet avoids the ambiguity of presenting an incorrect small reading to the display devices. Thus, if the apparatus is being used to locate fish, an echo from the bottom of the body of water will not be confused with an apparently nearby fish echo. It is understood the illustrated embodiment, utilizing two decimal digits, is by way of example only and is principally useful in the location of fish or other submerged objects, or in depth detection in relatively shallow bodies of water. The same circuit is expandable to provide greater depth readings by substituting a binary-coded-decimal counter having an additional stage or stages driving a greater number of decoders and a greater number of liquid crystal display devices.

Back plane oscillator 164 is conventional for use with liquid crystal display devices and suitably comprises a type 4047 integrated circuit device producing an output between 30 and 60 Hertz with a 50 percent duty cycle. The back plane oscillator is connected to the back plane pin on each liquid crystal display device, and also to pins 6 on decoders 148 and 150 to provide gating of the outputs on the seven-segment leads in a manner similar to the gating illustrated by exclusive-OR gate 166 driving the decimal point pin of the "ones" liquid crystal display device 40a. Thus, the decoder outputs to the liquid crystal display devices are varied in-phase with the liquid crystal display device back plane in the absence of a desired indication, and out-of-phase with the liquid crystal display back plane to provide a segment of output indication.

In a particular embodiment according to the present invention, the decimal point for the "ones" liquid crystal display device 40a is not employed as a decimal point in the conventional sense. Rather, the whole liquid crystal display device 44a is inverted so that the decimal point physically appears at the upper right-hand corner, where it may be considered a "foot" indicator. The foot indicator flashes so long as transmitter pulses are being generated. Considering this portion of the circuit more particularly, pin 7 of transmit receive device 102' provides an output pulse coincident with each transmit pulse so long as the transmit-receive device is operating properly. This lead is connected via negatively poled diode 168 to an integrating circuit comprising capacitor 170 returned to ground and resistor 172 returned to a positive voltage. The integration time is such that an output is provided to exclusive-OR gate 174 for about half the period between transmit pulses. The retaining input of exclusive-OR gate 174 is grounded whereby the integrated signal is further coupled to one input of exclusive-OR gate 166. The remaining input of gate 166 receives the output of back plane oscillator 164 as hereinbefore mentioned. Consequently, the decimal point indicator in the "ones" liquid crystal display device 40a will flash on and off so long as transmitter pulses are being generated. As the batteries of the apparatus become weak, the transmit receive device 102' will no longer provide transmit pulses, and the absence of the flashing point will indicate to the operator that the device is not functioning correctly and the batteries need to be changed. Furthermore, if the transducer 24 is operating incorrectly, the transmit pulse indication on pin 7 of device 102' can become prolonged whereby the integrated value across capacitor 170 continuously enables exclusive-OR gate 174. Thus, a continuously displayed point on the "ones" liquid crystal display device 40a is an indication of a faulty or malfunctioning transducer. As hereinbefore described, the power supply comprises the batteries 50 and 52 in series with reed switch 74.

The pin numbers of the integrated circuit devices have been indicated in part where necessary to illustrate and describe the present circuit. Remaining pin connections and the like are quite standard and are understood by those skilled in the art. The circuit values where shown for individual components are illustrative of the particular embodiment.

Considering overall operation according to the present invention, the device, which is quite small and easily held in one hand, is grasped by hand grip portion 12 and the forward end of the barrel portion 10, including nose piece 18 is held under water. The trigger 94 is compressed causing magnet 100 to come into proximity with reed switch 74 whereby the internal circuitry is empowered from batteries 50 and 52 and transducer 24 emits and receives sonic impulses. The distance to the reflecting object in the water is immediately displayed on display device 40 through window 38 where it is conveniently observed by the person holding the device. The liquid crystal display has the advantage of being visible in the sunlight and moreover neither the liquid crystal display nor remainder of the circuitry including the transducer has a high power consumption requirement. The entire device, according to one disclosed embodiment, draws approximately 10 milliamperes.

The device has the distinct advantage of being easily oriented by the user in any desired direction. Thus, one can pan the device across an underwater surface or the like and observe the general contour as registered on the display. The under surface can be explored for submerged objects, fish, and the like. The device also has the distinct advantage of being usable in any boat or vessel, no matter how small, without requiring any connection whatsoever to the vessel or vessel power supply. For example, the device can be used by a fisherman in a rowboat to locate fish or submerged objects, as well as for indicating water depth. The device is substantially completely watertight and can be entirely submerged underneath the water surface if so desired, or it can be accidentally dropped into the water without harm. When batteries need replacing, the cartridge 48 is easily removed by urging the same downwardly from the hand grip portion. After the batteries are replaced, the cartridge is slid upwardly into the hand grip portion, at the same time making battery connection with the circuitry on board 14, and completing a watertight enclosure by means of seal 88 at the lower end of the hand grip portion. Advantageously, internal power switching is accomplished without requiring any physical connection between the externally operated trigger carried by the battery cartridge and the contacts of reed switch 74 located within the watertight interior of the device when the battery cartridge is in place.

While we have shown and described a preferred embodiment of our invention, it will be apparent to those skilled in the art that many changes and modifications may be made without departing from our invention in its broader aspects. We therefore intend the appended claims to cover all such changes and modifications as fall within the true spirit and scope of our invention.

We claim:

1. Depth finding apparatus comprising:

a hand held self-contained housing having a water immersible nose portion at the forward end thereof carrying a sonic transducer adapted to transmit and receive sonic impulses in a direction substantially forward of said nose portion within a body of water into which said nose portion is submerged, such that the direction of transmission and reception of sonic impulses within said body of water is predetermined by the manual orientation of said housing with respect to the body of water, transmitting and receiving circuitry located within said housing and having electrical connection with said transducer for operating the same to transmit sonic impulses beneath the surface of said body of water and receive echoes from beneath said surface, wherein an interior portion of said housing containing said circuitry is substantially watertight, means for providing power within said housing for energizing said transmitting and receiving circuitry, and manually controllable switch means for causing said transmitting and receiving circuitry respectively to initiate transmission of sonic impulses by said transducer and the reception of echoes from beneath said surface, said housing further including a display means mounted rearwardly of said nose portion above the water surface when said nose portion is submerged for providing a visibly readable indication to the operator of the apparatus, said display means being coupled to the receiving circuitry within said housing for providing a depth reading indication corresponding to echoes received from beneath said surface, said housing including a substantially barrel-shaped portion having said nose portion on the forward end thereof and having said display means mounted on the opposite end thereof and including a hand grip portion extending outwardly from the barrel-shaped portion, a battery cartridge slidably receivable into the hand grip portion from the end thereof remote from said barrel-shaped portion, said battery cartridge carrying batteries comprising said means for providing power, wherein said battery cartridge is provided with contact means for making connection with said transmitting and receiving circuitry within said housing when said battery cartridge is slid into position, said battery cartridge including sealing means proximate the end thereof remote from said barrel-shaped portion for forming a watertight seal with said hand grip portion when said battery cartridge is in place, said battery cartridge including a trigger lever extending upwardly from the remote end of said battery cartridge and located externally of the wateright interior, said trigger lever having a trigger handle and a magnet carried thereby, said trigger handle being flexible for moving said magnet toward self hand grip portion, said switch means comprising reed switch means carried by said battery cartridge within the interior of said hand grip portion and adapted for connecting said batteries to said transmitting and receiving circuitry when said magnet is positioned by said trigger arm in close proximity to the reed contacts thereof.

2. The apparatus according to claim 1 wherein said display means comprises a liquid crystal display device.

3. The apparatus according to claim 1 wherein said hand grip portion is provided with a non-watertight forward chamber for slidably receiving said trigger lever, said trigger lever including a stop for limiting trigger lever movement within said chamber.

4. The apparatus according to claim 3 wherein said trigger lever is formed of flexible plastic.

5. Depth finding apparatus comprising:
a hand held self-contained housing having a water immersible nose portion at the forward end thereof carrying a sonic transducer adapted to transmit and receive sonic impulses in a direction substantially forward of said nose portion within a body of water into which said nose portion is submerged, such that the direction of transmission and reception of sonic impulses within said body of water is predetermined by the manual orientation of said housing with respect to the body of water,
transmitting and receiving circuitry located within said housing and having electrical connection with said transducer for operating the same to transmit sonic impulses beneath the surface of said body of water and receive echoes from beneath said surface, wherein an interior portion of said housing containing said circuitry is substantially watertight,
means for providing power within said housing for energizing said transmitting and receiving circuitry,
and manually controllable switch means for causing said transmitting and receiving circuitry respectively to initiate transmission of sonic impulses by said transducer and the reception of echoes from beneath said surface,
said housing further including a display means mounted rearwardly of said nose portion above the water surface when said nose portion is submerged for providing a visibly readable indication to the operator of the apparatus, said display means being coupled to the receiving circuitry within said housing for providing a depth reading indication corresponding to echoes received from beneath said surface,
said circuitry including a counter for measuring the time for an echo to return, said counter being initiated in counting operation substantially simultaneously with the transmission of a sonic impulse, a display latch for receiving the output of said counter and being coupled for latching the contents of said counter when the receiving circuitry receives a valid echo pulse, said display means receiving the count of said counter as latched by said display latch,
means for enabling the output of said display latch to said display means in response to a valid echo pulse received by said receiving circuitry, and means for disabling coupling of the output of said display latch to said display means in response to a predetermined count of said counter in excess of a predetermined value corresponding to the maximum count displayable by said display means.

6. Depth finding apparatus comprising:
a sonic transducer adapted to transmit and receive sonic impulses in a body of water,
transmitting and receiving circuitry having electrical connection with said transducer for operating the same to transmit periodic sonic impulses beneath the surface of said body of water and receive echoes from beneath said surface,
display means for providing a readout to the operator of the apparatus, said readout being indicative of depth information corresponding to echoes received,
a counter for measuring the time for an echo to return, said counter being initiated in counting operation in time relation with the transmission of a sonic impulse,
means for receiving the output of said counter and coupling the same to said display means only when an echo is received before transmission of the next sonic impulse, said display means being otherwise blanked between transmission of sonic impulses,
wherein said means for receiving the output of said counter comprises a display latch coupled for latching the contents of said counter when receiving circuitry receives an echo before the transmission of a next sonic impulse,
and including means for disabling coupling of the output of said display latch to said display means in response to a predetermined count of said counter in excess of a predetermined value corresponding to the maximum count displayable by said display means.

7. Depth finding apparatus comprising:
a hand held self-contained housing having a water immersible nose portion at the forward end thereof and carrying a sonic transducer means adapted to transmit and receive sonic impulses in a direction substantially forward of said nose portion within a body of water into which said nose portion is submerged,
transmitting and receiving circuitry located within said housing and having electrical connection with said transducer means for operating the same,
display means for providing a readout to the operator of the apparatus, said readout being indicative of depth information corresponding to echoes received,
said housing including a substantially barrel-shaped portion and including a hand grip portion extending outwardly from the barrel-shaped portion,
switch means disposed within said hand grip portion comprising a reed switch connected to said circuitry located within said housing for operating the same, and a trigger lever having its lower end affixed and extending externally forward of the interior of said hand grip portion, said trigger lever having a trigger handle and a magnet, said trigger lever comprising flexible plastic material operable under hand pressure for moving said magnet toward said hand grip portion for operating said reed switch.

8. The apparatus according to claim 7 wherein said hand grip portion is provided with a non-watertight forward chamber for receiving said trigger lever, said trigger lever including a stop for limiting trigger lever movement within said chamber.

9. The apparatus according to claim 7 further including a battery cartridge slidably receivable into the hand grip portion from the end thereof remote from said barrel-shaped portion, said battery cartridge being adapted to carry batteries for providing power to said circuitry via said switch means, said trigger lever being affixed to said battery cartridge at the lower end thereof remote from said barrel-shaped portion for positioning said trigger lever forwardly along said hand grip portion of said housing when said battery cartridge is in place within said hand grip portion, said trigger lever being removable from said hand grip portion with said battery cartridge.

10. The apparatus according to claim 9 wherein said trigger lever includes a lower abutment which bears against said hand grip portion when said battery cartridge is in place within said hand grip portion, whereby flexure of the trigger lever handle takes place above such abutment for bringing said magnet into proximity with said reed switch.

11. Depth finding apparatus comprising:
- a sonic transducer adapted to transmit and receive sonic impulses in a body of water,
- transmitting and receiving circuitry having electrical connection with said transducer for operating the same to transmit periodic sonic impulses beneath the surface of said body of water and receive echoes from beneath said surface,
- display means for providing a readout to the operator of the apparatus, said readout being indicative of depth information corresponding to echoes received,
- a counter for measuring the time for an echo to return, said counter being initiated in counting operation in time relation with the transmission of a sonic impulse,
- means for receiving the output of the counter and coupling the same to said display means when an echo is received,
- and means for disabling said means for receiving the output of said counter and coupling the same to said display means in response to a predetermined count of said counter in excess of a predetermined value corresponding to the maximum count displayable by said display means.

12. The apparatus according to claim 11 wherein said means for disabling coupling comprises a latch operated by a predetermined count of said counter and a gate operated by said latch for disabling said means for receiving the output of said counter and coupling the same to said display means.

* * * * *

UNITED STATES PATENT AND TRADEMARK OFFICE
CERTIFICATE OF CORRECTION

PATENT NO. : 4,281,404

DATED : July 28, 1981

INVENTOR(S) : RAY E. MORROW JR. AND RICHARD W. WOODSON

It is certified that error appears in the above—identified patent and that said Letters Patent is hereby corrected as shown below:

Column 8, line 53, "retaining" should have been --remaining--.

Column 9, lines 31-33, beginning with "The entire..." and ending with "...milliamperes." should have been deleted.

Claim 1, column 10, line 61, "wateright" should have been --watertight--.

Claim 1, column 10, line 64, "self" should have been --said--.

Signed and Sealed this

Eighth Day of February 1983

[SEAL]

Attest:

GERALD J. MOSSINGHOFF

Attesting Officer — Commissioner of Patents and Trademarks